April 8, 1952     A. G. SLOCUM     2,592,480
PORTABLE CONVEYER AND GATHERER FOR GRAIN
Filed Sept. 17, 1948     4 Sheets-Sheet 1
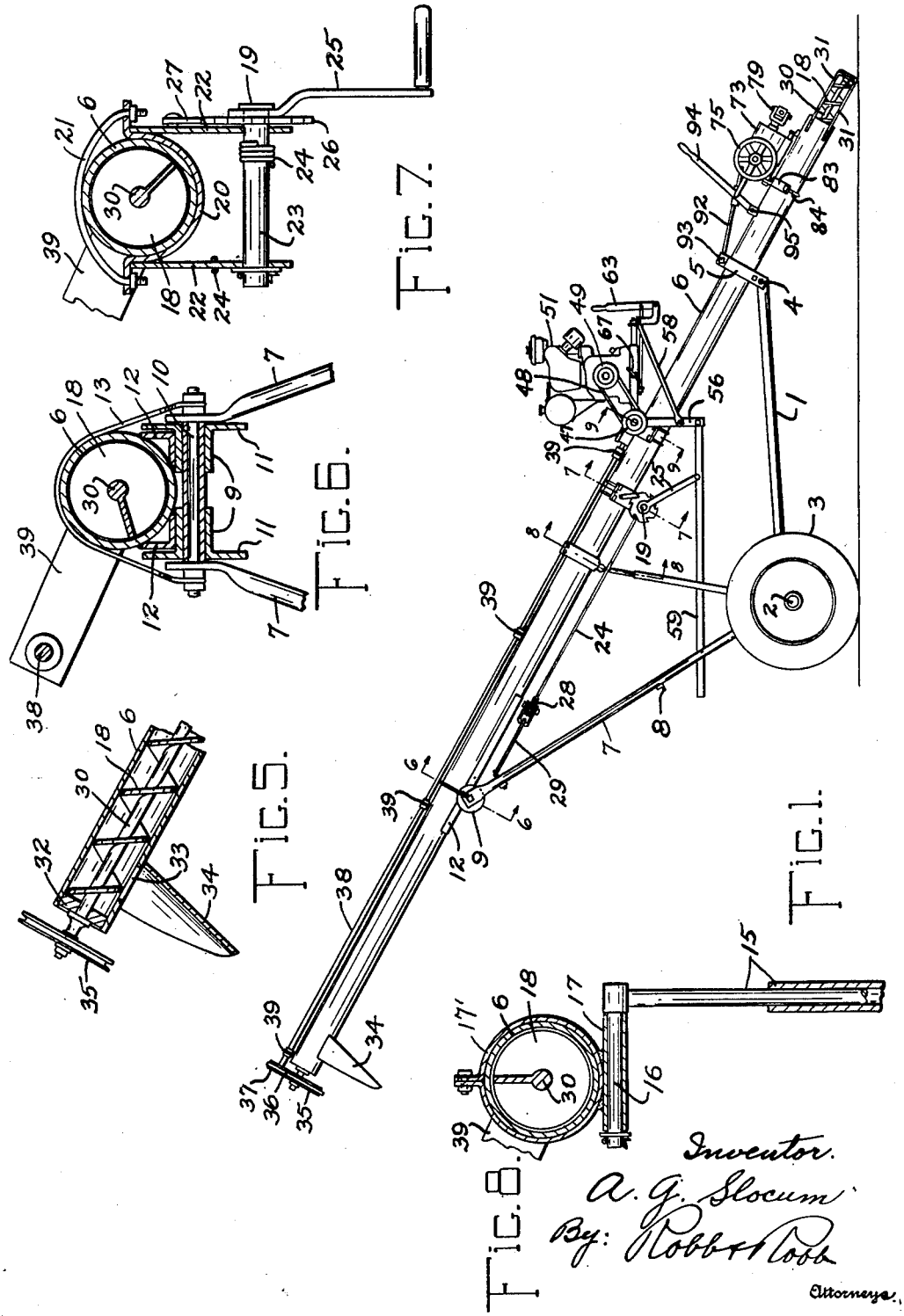
Inventor.
A. G. Slocum
By: Robb & Robb
Attorneys April 8, 1952
A. G. SLOCUM
2,592,480
PORTABLE CONVEYER AND GATHERER FOR GRAIN
Filed Sept. 17, 1948
4 Sheets-Sheet 2
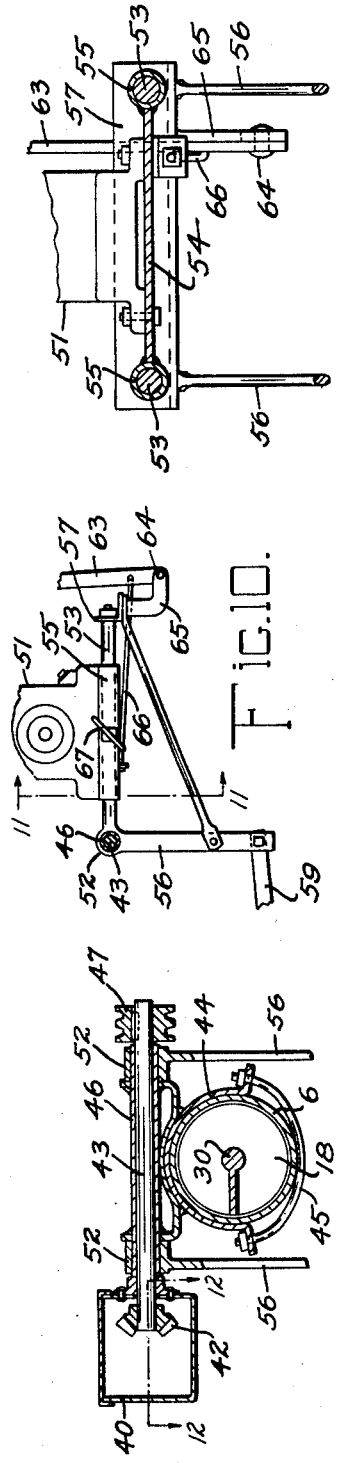
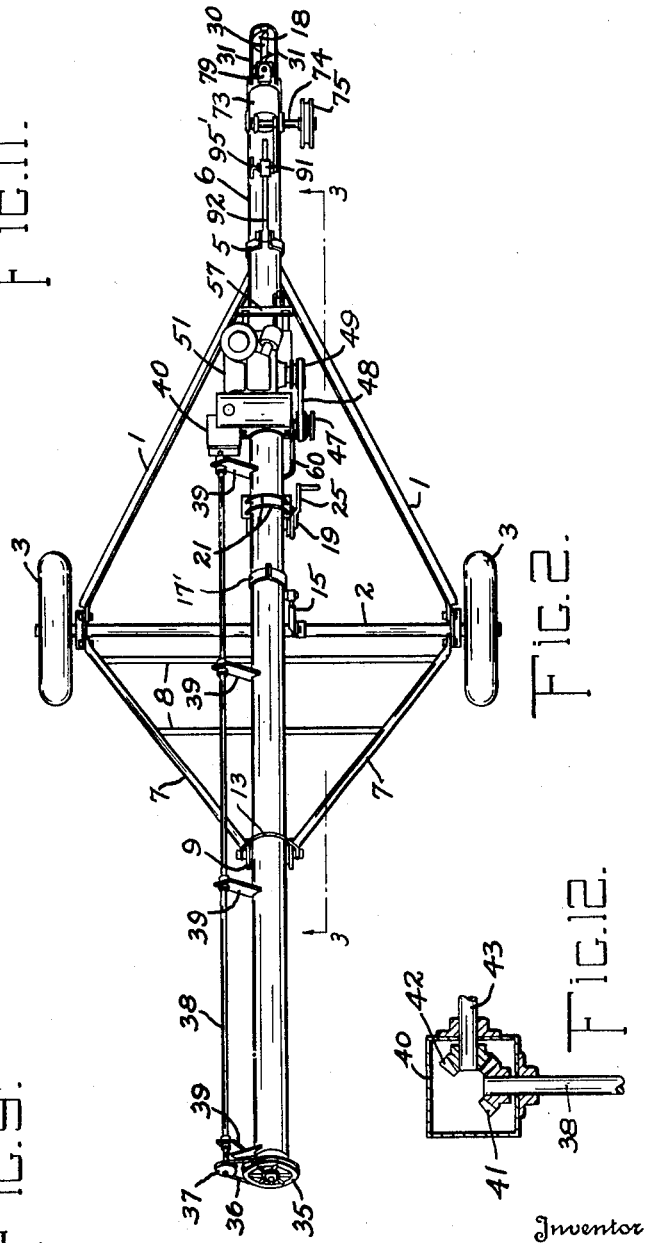
Inventor
A. G. Slocum
By Robbs Cobb
Attorneys April 8, 1952 A. G. SLOCUM 2,592,480
PORTABLE CONVEYER AND GATHERER FOR GRAIN
Filed Sept. 17, 1948 4 Sheets-Sheet 3
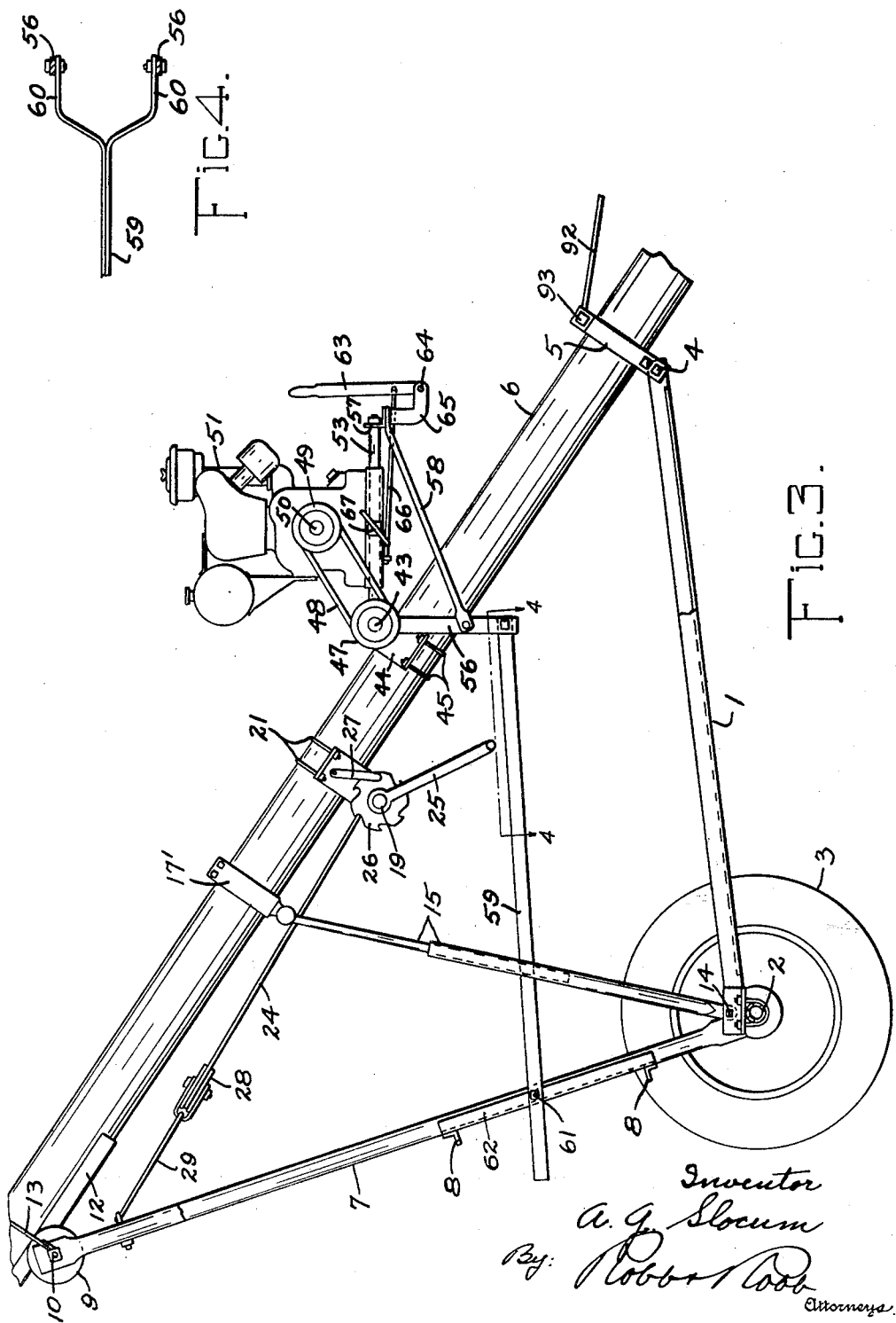

April 8, 1952     A. G. SLOCUM     2,592,480
PORTABLE CONVEYER AND GATHERER FOR GRAIN
Filed Sept. 17, 1948     4 Sheets-Sheet 4
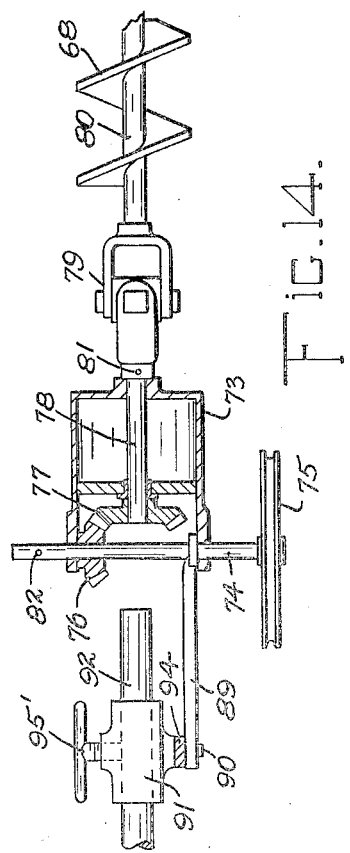

Patented Apr. 8, 1952

2,592,480

UNITED STATES PATENT OFFICE 2,592,480

PORTABLE CONVEYER AND GATHERER FOR GRAIN

Arthur G. Slocum, Ensign, Kans.

Original application February 20, 1947, Serial No. 729,867. Divided and this application September 17, 1948, Serial No. 49,804

5 Claims. (Cl. 198—9)

This application is a division of my prior application Serial No. 729,867, filed February 20, 1947, now Patent No. 2,528,917, issued November 7, 1950.

The present invention relates to material handling and loading apparatus, and more especially to portable conveyors for handling and loading grain and other granular or bulk materials which are oftentimes piled on the ground or floor for subsequent transfer to trucks, bins or other containers or transporting mediums.

One of the primary objects of the invention is to provide a simple, sturdy, light-weight portable conveyor which can be easily handled and operated, and which is economical in operation, as well as adaptable to various conditions of use and adjustment of elevation.

Another primary object of the invention is to provide a portable conveyor of the worm and conveyor tube type, wherein the worm and tube are mounted on a portable frame which is so constructed as to permit the worm and tube to be quickly and effectively adjusted to any desired inclination, with one end of the worm and tube resting upon or spaced from the ground or floor on which a pile of grain or some other material has been deposited, and with the other end elevated to any desired height.

A further and primary object of the invention is to provide a portable conveyor of the character mentioned just above, wherein the worm is power-driven by a motor or other prime mover, preferably of the internal combustion engine type, mounted directly on the conveyor and automatically self-leveling responsive to the change in or adjustment of the inclination of the worm and conveyor tube.

A still further object of the invention is to provide a portable conveyor of the worm and tube type, which includes a main worm which is normally disposed with its longitudinal axis in an upwardly inlined position within a conveyor tube, and a separate auxiliary worm attachment which may be laterally adjusted to various positions in a more or less horizontal plane, said auxiliary worm coacting with the main worm in such a manner as to gather up or drag the grain or other material, as the case may be, to the lower end of the main worm so that the material will be conveyed or elevated by the latter worm through the conveyor tube, both of said worms preferably being power-driven from a common source of power suitably mounted on the conveyor.

Other and further objects and advantages of the invention will be hereinafter described and the novel features thereof defined by the appended claims.

In the drawings:

Figure 1 is a view in side elevation of a portable conveyor constructed in accordance with the present invention;

Figure 2 is a view of the conveyor in top plan;

Figure 3 is a fragmentary vertical sectional view taken approximately on the line 3—3 of Figure 2, and shown on a somewhat enlarged scale to better disclose the details of the supporting frame, the winch for adjusting the inclination and elevation of the main worm and conveyor tube, and the engine mounting;

Figure 4 is a fragmentary horizontal sectional view taken on the line 4—4 of Figure 3, showing a part of the lever system which serves to automatically self-level the engine and its supporting bed or frame;

Figure 5 is a fragmentary vertical sectional view, on a somewhat enlarged scale, of the upper end of the main worm and conveyor tube;

Figure 6 is a transverse sectional view on an enlarged scale, as taken on the line 6—6 of Figure 1, through the upper end of the adjustable A-frame and its conveyor tube supporting roller;

Figure 7 is a transverse sectional view on an enlarged scale, as taken on the line 7—7 of Figure 1, through the axis of the winch;

Figure 8 is another transverse sectional view on an enlarged scale, as taken on the line 8—8 of Figure 1, through the telescopic brace or support which serves to hold the main worm and conveyor tube against lateral displacement relative to the frame;

Figure 9 is a transverse sectional view on an enlarged scale, as taken on the line 9—9 of Figure 1, through the axis of the cross drive shaft which is driven by the engine and which forms a part of the gear drive which transmits power from the engine to the main worm;

Figure 10 is a fragmentary view in side elevation, showing the self-leveling engine support and the means for slidably adjusting the engine on its support;

Figure 11 is a transverse sectional view on an enlarged scale, as taken on the line 11—11 of Figure 10, through the self-leveling engine support;

Figure 12 is a detail view in horizontal section, taken through the gear drive unit of the power transmitting means;

Figure 13 is a fragmentary view in side elevation, showing the conveyor equipped with an auxiliary gathering or drag worm disposed in operative relation to the main worm and driven from a common source of power;

Figure 14 is a sectional view on an enlarged scale, as taken on the line 14—14 of Figure 15, and showing the driving means for the auxiliary worm and a portion of the adjustable control for the latter;

Figure 15 is a transverse sectional view on an enlarged scale, as taken on the line 15—15 of Figure 13, through the auxiliary worm driving means, its adjustable supports, and the main worm and conveyor tube; and Figure 16 is a view in end elevation on an enlarged scale, of the operating handle or lever by means of which lateral swinging adjustments of the auxiliary worm are performed or facilitated.

Like reference characters designate corresponding parts in the several figures of the drawings, wherein 1 designates a frame composed of two frame members arranged in forwardly converging relation to each other, as best shown in Figures 1 to 3 inclusive, said frame members each having the form of an angle-iron or other suitable structural member. At the rear end of the frame 1, the frame members are each connected to a transversely extended axle 2, with the frame members substantially spaced apart and connected to the axle adjacent to the respective ends of the latter. Mounted on each end of the axle 2 is a wheel 3, said wheels serving to facilitate movement of the wheeled frame from place to place so as to dispose the conveyor mechanism carried by the frame in the position desired. The movement of the wheeled frame may be performed by manual force, or it may be moved or drawn from place to place by a tractor or other power medium.

At the forward end of the frame 1, the frame members are pivotally connected at 4 to a split clamping band 5, said band embracing and being clamped about a conveyor tube generally designated 6.

Also pivotally attached to the axle 2 and extending forwardly and upwardly therefrom is an A-frame generally designated 7, said A-frame being composed of two upwardly converging frame members of tubular or other form, and preferably having two or more horizontally disposed cross-braces 8, 8, formed of angle irons or other structural members, suitably connected to the frame members as by welding. The frame members of the A-frame are widely separated at their lower ends, and are preferably connected to the axle 2 near the opposite extremities thereof and adjacent to the rear ends of the frame members which form the frame 1.

Rotatably mounted between the upper ends of the frame members of the A-frame 7 is a roller 9 which is rotatably supported on a pin or axle 10 extended transversely through the upper end of the A-frame. The roller 9 bears against the lower side of the conveyor tube 6, and at each end of the roller there is preferably provided an annular flange 11 which coacts with a stationary guide member preferably having the form of an angle iron suitably attached to the conveyor tube as by welding, as indicated at 12, 12, there being one of these guide members on each side of the conveyor tube, and the guide members being disposed in parallel relation to the longitudinal axis of the conveyor tube. Thus, the roller 9 is free to roll on the lower surface of the conveyor tube 6, with the conveyor tube held against lateral displacement relative to the roller by means of the flanges 11, 11 and guide members 12, 12. In order to maintain the conveyor tube in engagement with the roller 9, and to prevent the conveyor tube from becoming upwardly displaced or jumping off of the roller, particularly during transportation or movement of the conveyor from place to place, a cable 13, chain or other flexible member is passed over the upper side of the conveyor tube 6, with the opposite ends of the cable attached to the other extremities of the pin or axle 10, as best shown in Figure 6 of the drawings.

Pivotally attached, as at 14, to an intermediate point on the axle 2 is a telescopic brace or arm generally designated 15, the upper end of the brace 15 being laterally extended, as at 16, and rotatably received in a bushing or sleeve 17 disposed transversely across the bottom of the conveyor tube 6 at about the mid-point thereof, and suitably secured thereto as by means of a split clamping band 17' to which the sleeve 17 is welded. The purpose of this telescopic brace or arm 15 is to prevent lateral displacement of the conveyor tube 6 relative to its supporting frame, while at the same time allowing a change or adjustment of the inclination or elevation of the conveyor tube in which there is rotatably mounted a worm or screw 18 arranged coaxially therein and extending from a point somewhat beyond the forward end of the conveyor tube, to the upper or rear end of the tube.

Adjustment of the angular position or elevation of the conveyor tube 6 and its worm 18 is effected by swinging the A-frame 7 about the axis of the pivotal connection of the lower end of the A-frame with the axle 2, it being understood that the A-frame is free to swing in a vertical plane. In order to produce the swinging movements of the A-frame in the manner just described, for the purpose of changing the inclination or elevation of the conveyor tube, there is provided a winch generally designated 19 which is suitably attached to the conveyor tube 6 at an intermediate point, said attachment being preferably attained by means of a strap 20 and one or more tie-bolts 21 embracing the conveyor tube. Welded or otherwise suitably secured to the strap 20 and depending therefrom in laterally spaced relation to each other is a pair of brackets 22, 22 through the lower end of which is extended a winding drum or reel 23 on which a cable or rope 24 is wound. At one end of the drum or reel 23, a crank 25 is secured thereto to permit the same to be conveniently rotated by hand. A ratchet 26 and a coacting pawl or dog 27 is provided to hold the cable drum or reel 23 in any position of winding on or paying out the cable 24. One end of the cable is anchored to the drum or reel 23 on which it is wound, and from the drum, the cable passes through a block or sheave 28 which is suitably attached to the upper end of the A-frame as by means of a flexible anchor 29. After passing about the block or sheave 28, the cable 24 is suitably dead-ended, as by attaching the same to one of the brackets 22 of the winch assembly, as clearly shown in Figure 7.

As clearly shown in Figures 1 and 2, the worm or screw 18 projects forwardly somewhat beyond the forward lower end of the conveyor tube 6, and at this end, the worm shaft, designated 30, is rotatably supported or journaled in an open cage or frame composed of four bars designated 31, each bar being suitably secured, as by welding, to the end of the conveyor tube 6, and projecting forwardly therefrom. At their extreme forward ends, the bars 31 are diametrically extended across the axis of the worm 18 in the form of a cross, with the worm shaft 30 extending through and journaled in the bars at their point of intersection.

At the upper rear end of the conveyor tube, the worm shaft 30 is journaled in a bearing block 32 suitably fixed within the extreme end of the conveyor tube. Just short of the upper end of the conveyor tube, the tube is provided in its bottom side with a discharge opening 33 beneath which is disposed a short chute 34 suitably attached to the conveyor tube as by welding. The worm shaft 30 projects somewhat beyond the extreme upper end of the conveyor tube 6, and fixedly mounted on the worm shaft is a pulley 35, said pulley being belted by a belt 36 to a second pulley 37 on the upper end of a drive shaft 38 which is suitably rotatably supported in a plurality of laterally extended brackets 39, attached, as by welding, to the outside of the conveyor tube. The drive shaft 38 extends parallel to the conveyor tube 6, in spaced relation thereto, and at its lower end, the drive shaft is connected to a gear unit composed of two beveled pinions disposed within a housing 40, as best shown in Figures 2, 9 and 12. One of the beveled pinions just referred to is designated 41 and is fixed to the drive shaft 38, and the other beveled pinion is designated 42 and is fixed to a cross shaft 43, said beveled pinions meshing with each other as clearly shown in Figure 12.

The gear unit, including the cross shaft 43 is suitably attached to the conveyor tube 6 in any suitable manner, preferably by means of a strap 44 and one or more tie-bolts 45 embracing the conveyor tube. The strap 44 is suitably attached, as by welding, to a sleeve 46 in which the cross shaft 43 is journaled, with the gear unit, previously described, disposed at one end of the sleeve. Mounted on the end of the cross shaft 43 opposite to the gear unit is a V-belt pulley 47, said pulley 47 being belted by one or more belts 48 to a corresponding pulley 49 fixed to the drive shaft 50 of a suitable power source or prime mover which preferably has the form of an internal combustion engine, as generally indicated at 51.

In order to maintain the engine 51 in a constantly level condition, as is essential with such engines, irrespective of the angle of inclination of the conveyor tube 6 and its worm or screw 18, the engine is preferably mounted on an adjustable support or frame which is preferably self-leveling responsive to any change in the angular position or elevation of the conveyor tube 6 and its worm. This self-leveling adjustment of the engine mounting will now be described.

Referring to Figures 1, 3, 4, 9, 10 and 11, it will be seen that the engine mounting includes two spaced trunnions or bearing sleeves 52, 52 which are rotatably or rockably supported on the opposite ends of the sleeve 46 through which the cross shaft 43 extends. Projecting forwardly from these two sleeve members 52, 52 is a pair of cylindrical bars 53, 53 on which is slidably mounted a bed plate 54, the opposite edges of said bed plate 54 being tubular in form as indicated at 55, 55 and being slidably mounted on the bars 53, 53. The engine 51 is suitably bolted or otherwise attached to the bed plate 54 as clearly shown in Figure 11. Extending downwardly from the respective sleeve members 52, 52 is a pair of lever arms 56, 56, each of which is rigid with its sleeve member 52 and with the corresponding bars 53 so that this entire assembly on which the engine 51 is mounted, is free to rock about the axis of the cross shaft 43. At the forward ends of the bars 53, 53, the bars are secured to a cross brace 57 which preferably has the form of an angle iron, and rigidly interconnecting each lever arm 56 with the cross brace 57 is a diagonal brace 58, there being one of such diagonal braces for each side of the engine mounting to reinforce the same.

Pivotally connected to the lower extremities of the respective lever arms 56, 56 is a forked link 59, said link having two laterally spaced arms 60, 60 which are respectively attached to the lower ends of the lever arms 56, 56 as clearly shown in Figure 4. From the lever arms 56, the link 59 leads rearwardly, and at its rear end it is pivotally attached, as at 61, to a bar 62 which may have the form of an angle iron, and which is suitably secured, as by welding, to the midpoints of the two cross pieces or braces 8, 8 of the A-frame 7. Thus, when the A-frame is moved in either direction, as by means of the winch 19, to change the angle of inclination, or elevation of the conveyor tube 6, the motion of the A-frame is imparted to the engine mounting through the link 59, lever arms 56, 56, and bars 53, 53 on which the bed plate 54 is mounted to support the engine. By suitably selecting the proper lengths for the link 59 and the lever arms 56, 56, the engine support will automatically be leveled responsive to any change in the position of the A-frame 7, and consequently any change in the angular portion or elevation of the conveyor tube.

As previously mentioned, the bed plate 54 on which the engine 51 is supported, is slidable on the bars 53, 53, the purpose of this being to permit movement of the engine 51 to slacken or tighten the drive belt 48, and consequently to interrupt or establish the power drive without the necessity of employing a clutch. In order to facilitate the movements of the engine 51 for the purpose of slackening or tightening the drive belt, as desired, I preferably provide an actuating lever 63 having its lower end pivotally connected at 64 to a bracket 65 secured to the brace 57 at the forward ends of the bars 53, 53. Extending between the actuating lever 63 and the bed plate 54, and pivotally connected thereto is a rod or link 66 by means of which forward and rearward movements of the control lever may be imparted to the bed plate 54 and the engine thereon. For the purpose of locking the bed plate 54 and the engine in any position of forward or rearward adjustment, I preferably provide a set screw 67 extending through one of the tubular edges 55 of the bed plate 54, said set screw having threaded engagement with the tubular edge of the bed plate so that the set screw can be screwed up tight against the bar 53 to lock the bed plate 54 in adjusted position on the two bars 53, 53.

It will be understood from the foregoing that in the use of the portable conveyor herein described, the same is moved into a position to bring the projecting end of the worm or screw 18 at the lower end of the conveyor tube 6, into a position such that the worm or screw is submerged or otherwise in contact with the materials which are to be elevated through the conveyor tube by the worm. When so positioned, the elevation or inclination of the conveyor tube may be adjusted by means of the winch 19 so that the materials conveyed through the tube may be discharged from the upper end thereof into a truck, bin, or other suitable receptacle or the like. When the conveyor is ready for operation, the engine 51 may then be started, and upon manipulating the actuating lever 63 in a forward direction to move the engine forwardly on its mounting or support, the drive belt 48 is caused to be tightened for the purpose of transmitting power from the engine to the worm or screw 18 which is rotated by actuation of the cross shaft 43, gear unit, main drive shaft 38, pulley 37, belt 36, and pulley 35. In order to discontinue operation of the worm or screw 18 at any time, it is only necessary to shift the actuating lever 63 rearwardly so as to move the engine 51 into a position sufficient to loosen the belt 48, thereby interrupting the drive.

As the supply of the materials that are to be conveyed through the tube 6 becomes depleted in the vicinity of or around the lower end of the worm or screw 18, the position of the conveyor may be changed from time to time to bring the worm into an operative position relative to the remaining material. In order to reduce the number of changes of position of the conveyor that might otherwise be necessary for the purpose of handling or conveying a complete pile or deposit of materials, the conveyor may be provided with an attachment having the form of an auxiliary worm or screw as more particularly shown in Figures 13 to 16 inclusive. In Figure 13, the general arrangement of the conveyor is the same as is shown in Figures 1 to 12 inclusive, and as has been hereinbefore described, and the various parts of the conveyor are accordingly designated by the same reference characters. The auxiliary worm or screw attachment is designated 68 in Figure 13, the forward end of the same being rotatably mounted in a supporting bracket 69 which may be rested upon the ground or the floor substantially in advance of the main worm or screw 18. Rigidly connected to the bracket 69, and extending upwardly therefrom, is a manipulating handle 70, the purpose of which is to facilitate swinging movements of the auxiliary worm 68 in a more or less horizontal plane, as desired for the purpose of changing the position of the auxiliary worm, from time to time, to gather up or drag all of the materials within the range thereof, up to the lower end of the main worm 18.

The auxiliary worm 68 is preferably driven from the same power source as the main worm 18, and for this purpose, the pulley 47 which is mounted on the cross shaft 43 is operatively connected by a belt 71 to another cross shaft 72 of a gear unit generally designated 73 mounted on the lower end of the conveyor tube 6. The cross shaft of the gear unit 73 is designated 74 and is provided at one end with a pulley 75 which is fixed thereto and about which the belt 71 passes. At the opposite end of the cross shaft 74, the cross shaft has fixed thereto a beveled pinion 76 which meshes with another beveled pinion 77 which is fixed to a shaft 78 which extends forwardly from the gear unit 73. The shaft 78 is extended far enough beyond the gear unit 73 as to permit the attachment thereto of a universal joint connection generally designated 79 which is in turn fixed to the rear end of the auxiliary worm shaft 80. The connection between the universal joint 79 and the shaft 78 may be conveniently made by means of a displaceable pin 81 which extends through the shaft 78 and that portion of the universal joint which telescopically fits over the shaft 78.

Instead of connecting the auxiliary screw or worm 68 to the shaft 78, the same may be connected to the cross shaft 74 which is extended laterally from the side of the gear unit 73 opposite to the pulley 75, so as to permit the universal joint 79 to be applied onto the cross shaft 74, the latter being provided with an aperture 82 therethrough to receive the pin 81 previously referred to. When the auxiliary worm 68 is connected to the cross shaft 74, it is necessary to cross the belt 71 in order to operate the auxiliary worm in the proper direction to feed the materials engaged thereby towards the main worm 18.

In order to set the auxiliary worm 68 into operation, or to interrupt the operation thereof, at will, the gear unit 73 is shiftably mounted on the conveyor tube 6 so that it may be moved forwardly or rearwardly to slacken or tighten the belt 71, as required. In accomplishing this purpose, a clamping band 83 is applied onto the upper side of the conveyor tube 6, and clamped thereto by means of one or more tie-bolts 84, said band 83 having welded or otherwise secured thereto a bar or angle iron 85 which is disposed transversely across the upper side of the conveyor tube. Spaced from the bar 85 is a second bar 86 welded or otherwise suitably secured to the upper side of the conveyor tube 6 and disposed transversely thereof in parallel relation to the bar 85. Extending between the two bars 85, 86 and disposed longitudinally along the upper side of the conveyor tube 6 in spaced relation to the latter and in parallel laterally spaced relation to each other, is a pair of rods or guides 87, 87 on which is slidably mounted a base plate or bracket 88 which is suitably secured, as by welding, to the lower side of the gear unit 73. Thus, the gear unit 73 is slidably adjustable on the guide bars or rods 87, 87, and to effect such adjustment, there is attached to the gear unit 73 a link 89 which is pivotally connected at 90 to a sleeve 91 which is slidably received on a bar 92, the latter in turn being pivotally connected at 93 to the clamping band 5. An operating lever 94 is pivotally connected at its lower end to the conveyor tube 6, as indicated at 95, and also is pivotally connected to the sleeve 91 at the point of pivotal connection of the latter with the link 89. By shifting the operating lever 94 forwardly or rearwardly, the gear unit 73 will be correspondingly shifted forwardly or rearwardly, as the case may be, within the limits of adjustment of the same on the guide bars or rods 87, 87. This adjustment need be only very small, and merely sufficient to permit the belt 71 to be loosened or slacked enough to interrupt the drive from the engine 51. In order to hold the gear unit 73 and the operating lever 94 in any position of adjustment, the sleeve 91 is preferably provided with a set screw 95' which is threadedly engaged in the sleeve so as to enable the same to be tightened up against the bar 92 so as to hold the sleeve 91 against movement on the bar 92.

When the auxiliary worm 68 is attached to the shaft 78, the auxiliary worm may be swung about the axis of the universal joint 79 through an angle of approximately 180°, or in other words, approximately 90° to either side of the longitudinal axis of the shaft 78. Similarly, when the auxiliary worm is attached to the shaft 74, it may also be swung through an arc of approximately 180°, thereby materially increasing the range of the auxiliary worm beyond the range it would have if it were connected to the shaft 78 alone. It will be further understood that when the use of the auxiliary worm 68 is not required, it may be detached from the gear unit 73. When its use is desired, it may be quickly attached either to the shaft 78 or the shaft 74. Also, when the auxiliary worm is not in use, the entire gear unit 73 with its shifting instrumentalities may be completely removed from the conveyor tube, if desired.

While the specific details have been herein shown and described, the invention is not confined thereto as changes and alterations may be made without departing from the spirit thereof as defined by the appended claims.

I claim:

1. A portable conveyor of the class described, comprising a wheeled frame having a conveyor tube mounted thereon and adjustable relative thereto to assume different angles of inclination, a main worm rotatably mounted within the conveyor tube and projecting from the lower end thereof to engage and receive the materials to be conveyed through the conveyor tube for discharge from the upper end of the latter, a motor also carried by the frame and operatively connected with the main worm for driving the same, power transmission means mounted on the lower end of the conveyor tube, and an auxiliary worm supported by and operatively universally connected to said transmission means and extending to a point substantially in advance of the main worm for gathering and dragging the materials towards the receiving end of the main worm, said transmission means being operatively connected with the motor which drives the main worm and being operable to render the auxiliary worm inoperative independently of the main worm for driving the auxiliary worm through the universal connection aforesaid.

2. A portable conveyor of the class described, comprising a wheeled frame having a conveyor tube mounted thereon and adjustable relative thereto to assume different angles of inclination, a main worm rotatably mounted within the conveyor tube and projecting from the lower end thereof to engage and receive the materials to be conveyed through the conveyor tube for discharge from the upper end of the latter, a motor also carried by the frame and operatively connected with the main worm for driving the same, and an auxiliary worm having a universal connection with the lower end of the conveyor tube and extended therefrom to a point substantially in advance of the main worm for gathering and dragging the materials towards the receiving end of the main worm, said auxiliary worm being operatively connected with the motor which drives the main worm for driving the auxiliary worm through the universal connection aforesaid, the driving connection between the motor and the auxiliary worm including a transmission unit belted to the motor and slidably mounted on the conveyor tube for permitting tightening and slackening of the belt to respectively establish and interrupt operation of the auxiliary worm.

3. A portable conveyor of the class described, comprising a wheeled frame having a conveyor tube mounted thereon and adjustable relative thereto to assume different angles of inclination, a main worm rotatably mounted within the conveyor tube and projecting from the lower end thereof to engage and receive the materials to be conveyed through the conveyor tube for discharge from the upper end of the latter, a motor also carried by the frame and operatively connected with the main worm for driving the same, and an auxiliary worm having a universal connection with the lower end of the conveyor tube and extended therefrom to a point substantially in advance of the main worm for gathering and dragging the materials towards the receiving end of the main worm, said auxiliary worm being operatively connected with the motor which drives the main worm for driving the auxiliary worm through the universal connection aforesaid, the driving connection between the motor and the auxiliary worm including a transmission unit belted to the motor and slidably mounted on the conveyor tube for permitting tightening and slackening of the belt to respectively establish and interrupt operation of the auxiliary worm, manually operable means for slidably shifting the transmission unit to and from driving and drive-interrupting positions, and means for releasably restraining said transmission unit against movement in any position.

4. A portable conveyor of the class described comprising a wheeled frame having a conveyor tube mounted thereon and adjustable relative thereto to assume different angles of inclination, a main worm rotatably mounted within the conveyor tube and projecting from the lower end thereof to engage and receive the materials to be conveyed through the conveyor tube for discharge from the upper end of the latter, a motor also carried by the frame and operatively connected with the main worm for driving the same, and an auxiliary worm having a universal connection with the lower end of the conveyor tube and extended therefrom to a point substantially in advance of the main worm for gathering and dragging the materials towards the receiving end of the main worm, said auxiliary worm being operatively connected with the motor which drives the main worm for driving the auxiliary worm through the universal connection aforesaid, the driving connection between the motor and the auxiliary worm including a transmission unit belted to the motor and slidably mounted on the conveyor tube for permitting tightening and slackening of the belt to respectively establish and interrupt operation of the auxiliary worm, said transmission unit including a driving member disposed transversely to the conveyor tube and a second driving member disposed parallel to the conveyor tube, either of said driving members being selectively engageable with the auxiliary worm through the universal connection for driving the auxiliary worm.

5. A portable conveyor of the class described, comprising a wheeled frame having a conveyor tube mounted thereon and adjustable relative thereto to assume different angles of inclination, a main worm rotatably mounted within the conveyor tube and projecting from the lower end thereof to engage and receive the materials to be conveyed through the conveyor tube for discharge from the upper end of the latter, a motor also carried by the frame and operatively connected with the main worm for driving the same, power transmission means mounted on the lower end of the conveyor tube, and an auxiliary worm having a universal connection with said transmission means and being extended therefrom to a point substantially in advance of the main worm for gathering and dragging the materials towards the receiving end of the main worm, said transmission means being operatively connected with the motor which drives the main worm for driving the auxiliary worm through the universal connection aforesaid and being operable to render the auxiliary worm inoperative independently of the main worm, the forward end of said auxiliary worm being rotatably supported in a bracket adapted to rest on the ground or other surface on which the materials are located, and said bracket being shiftable with the auxiliary worm on an arc having its center at the universal connection, and the auxiliary worm defining the radius of the arc.

ARTHUR G. SLOCUM.

REFERENCES CITED

The following references are of record in the file of this patent:

UNITED STATES PATENTS

| Number | Name | Date |
|---|---|---|
| 1,395,068 | Weliki | Oct. 25, 1921 |
| 1,445,087 | Joy | Feb. 13, 1923 |
| 1,843,404 | Rasmussen | Feb. 2, 1932 |
| 2,058,125 | Bean | Oct. 20, 1936 |
| 2,330,296 | Lundberg | Sept. 28, 1943 |
| 2,387,189 | Steinmetz | Oct. 16, 1945 |
| 2,397,420 | Jorgensen | Mar. 26, 1946 |
| 2,483,290 | Mayrath | Sept. 27, 1949 |
| 2,528,917 | Slocum | Nov. 7, 1950 |

FOREIGN PATENTS

| Number | Country | Date |
|---|---|---|
| 721,672 | France | Dec. 22, 1931 |